United States Patent [19]
Czumak et al.

[11] 3,951,530
[45] Apr. 20, 1976

[54] METHOD AND APPARATUS FOR DEPOSITING PROCESSING FLUID ON CASSETTE CONTAINED FILM STRIPS

[75] Inventors: Frank M. Czumak, Derry, N.H.; Paul B. Mason, Magnolia; Joseph A. Stella, Peabody, both of Mass.

[73] Assignee: Polaroid Corporation, Cambridge, Mass.

[22] Filed: Aug. 16, 1974

[21] Appl. No.: 497,933

[52] U.S. Cl. .................................. 352/130; 352/72
[51] Int. Cl.² ........................................ G03C 11/00
[58] Field of Search .............................. 352/130, 72

[56] References Cited
UNITED STATES PATENTS
3,776,624   12/1973   Land ................................... 352/130

*Primary Examiner*—Monroe H. Hayes
*Attorney, Agent, or Firm*—David R. Thornton

[57] ABSTRACT

A method and apparatus for depositing a layer of processing fluid on an exposed film strip contained with the processing fluid and fluid depositing means in a multipurpose film cassette of the type in which the film strip is exposed, processed and viewed by projection without removal from the cassette. The processing fluid is doctored onto the emulsion side of the exposed film strip during rewinding movement of the strip under an applicator nozzle opening. The film strip is supported under a biasing force toward the nozzle approximating in magnitude the hydrodynamic force developed by doctoring the processing fluid against the other side of the film strip thus to achieve a net balance of forces on opposite sides of the film strip so that foreign particles such as dust and the like will pass the doctoring surface without deleterious accumulation of such particles thereon.

12 Claims, 3 Drawing Figures

METHOD AND APPARATUS FOR DEPOSITING PROCESSING FLUID ON CASSETTE CONTAINED FILM STRIPS

BACKGROUND OF THE INVENTION

This invention relates to methods and apparatus for processing photographic film strips and more particularly, it concerns an improved method and apparatus by which processing fluid supplied in the processor of a multipurpose film cassette is distributed uniformly over the surface of a strip of exposed film under conditions in which the hydrodynamic force developed by the nozzle and processing fluid is essentially equal to the spring force retaining the film strip against the nozzle.

As a result of recent developments in the motion picture art, a system has been devised by which a supply of light sensitive film contained in a multipurpose cassette can be exposed in a camera adapted to receive the cassette and then processed or developed to provide the conventional series of positive transparent image frames merely by placing the cassette in a viewing apparatus capable of activating a processor also contained in the cassette such that upon rewinding the exposed film, a coating or layer of processing fluid is deposited along the length of the film. After processing in this manner, the viewing device is operated as a projector to advance the film incrementally, frame by frame, past a light source so that the scene to which the film was exposed is reproduced on a screen. Preferably, the processing fluid effects a diffusion transfer of a negative image in a light sensitive emulsion layer to a positive image receiving layer.

While the advance in the motion picture art represented by such a system is apparent and needs no elaboration herein, it is to be noted as critical to satisfactory operation of the system that the processing fluid must be deposited uniformly within extremely small tolerances over the emulsion layer on the film during processing. Failure to achieve such uniform layer of the developing or processing fluid on the film strip emulsion will result in undesirable blemishes such as streaks, spots or the like in the image viewed during projection of the processed film.

The problems of achieving a uniform layer or coating of the fluid on the film during the processing operation can be readily understood by taking cognizance of the basic system requirement that each cassette carry its own processor and that the cassette and its components including the processor must be capable of mass production manufacturing techniques and the tolerance level incident to such techniques for the system as a whole to be acceptable in a competitive commercial market. Heretofore, a most promising solution to the problems involved the use of a molded nozzle structure provided with an inclined doctoring surface downstream from an opening through which the processing fluid passes into contact with the film strip during rewinding travel after exposure. The inclined doctoring surface of the nozzle provided a positive pressure gradient increasing in the direction of film travel to achieve uniform distribution of the deposited processing fluid. A processor of this type is disclosed in a copending application Ser. No. 360,678 filed May 16, 1973 by Edward F. Burke, Jr. et al, now issued on Mar. 11, 1975 as U.S. Pat. No. 3,871,013 and assigned to the assignee of the present invention.

Although the use of an inclined doctoring surface by which the processing fluid is distributed under a pressure gradient over the exposed emulsion of the film strip has proven to be a reasonable solution to the problems of achieving the necessary uniform deposition of processing fluid, other problems have been experienced with the accumulation of macroscopic or smaller particles at the trailing edge of the doctoring blade last to contact the processing fluid as it is deposited. Such particles are believed to be as a result of dust on the film which may enter the cassette through vent passages either during cassette storage prior to exposure or during exposure of the film while the cassette is loaded in a camera. The effect of the particles on the doctoring blade is the development of undesirable linear irregularities or streaking in the processing fluid layer deposited on the film. Such linear irregularities or streaks are often visible as blemishes in the image viewed during projection of the film strip. Further it has been noted that such streaking progresses in severity toward the end of the film strip which is last to pass under the nozzle and receive the deposition of processing fluid during the rewind processing cycle thus suggesting an accumulation or build-up of particles on the doctoring blade as the processing operation progresses from one end to the other end of the film strip.

SUMMARY OF THE INVENTION

In accordance with the present invention, lateral uniformity of processing fluid deposition on the film achieved in the past by doctoring the processing fluid against the film is retained without incurring undesirable streaking along the length of the film by balancing the forces acting against opposite sides of the film strip during the deposition and doctoring of the processing fluid onto the exposed emulsion surface thereof. As a result, the narrow gap defined between the trailing edge of the doctoring surface and the emulsion surface of the film strip may increase slightly to allow the passage of individual minute particles on the emulsion with the film strip as opposed to the progressive build-up and doctoring surface deterioration experienced with the relatively fixed gap previously used.

The balance of forces across the film strip during the deposition and doctoring of the processing fluid is achieved by a processing system design which accounts for the viscosity of the processing fluid, the velocity of film travel in relation to the doctoring surface as well as the length and inclination of the doctoring surface, all of which factors contribute to a hydrodynamic force component tending to move the film strip away from the doctoring surface and thus to increase the gap between the trailing edge of the doctoring surface and the emulsion side of the film strip. The hydrodynamic bias thus exerted on the film strip is opposed by a yieldable force such as that developed by a spring supporting a pressure pad engaging the side of the film opposite from the emulsion and the doctoring surface. In accordance with the invention, the spring force is selected to develop a force in the range of hydrodynamic forces developed by the doctoring surface.

Among the objects of the present invention are therefore: the provision of an improved method and apparatus for achieving a uniform deposition of processing fluid over the exposed emulsion side of a photographic film strip contained in a multipurpose cassette; the provision of such a method and apparatus by which the deposition of a uniform layer of processing fluid on the film strip is unaffected by minute particles of dust and the like carried on the surface of the emulsion side of the film strip; the provision of such a method and apparatus by which the build-up of particles on a doctoring surface operable to spread the processing fluid over the emulsion side of the film strip and an attendant deterioration of the processing fluid layer by streaking is avoided; the provision of such a method and apparatus by which continuous velocity variation in a moving run of film being wound on a spool driven at constant angular velocity is accounted for without meaningful variation in the layer of processing fluid deposited on the film strip; and the provision of such a method and apparatus which is readily adaptable to the commercial production of multipurpose film cassettes of the type in which a film strip is permanently contained during exposure, processing and projection operations.

Other objects and further scope of applicability of the present invention will become apparent from the detailed description taken in conjunction with the attached drawings in which like reference numerals designate like parts.

DESCRIPTION OF THE PREFERRED EMBODIMENT

Figure 1:
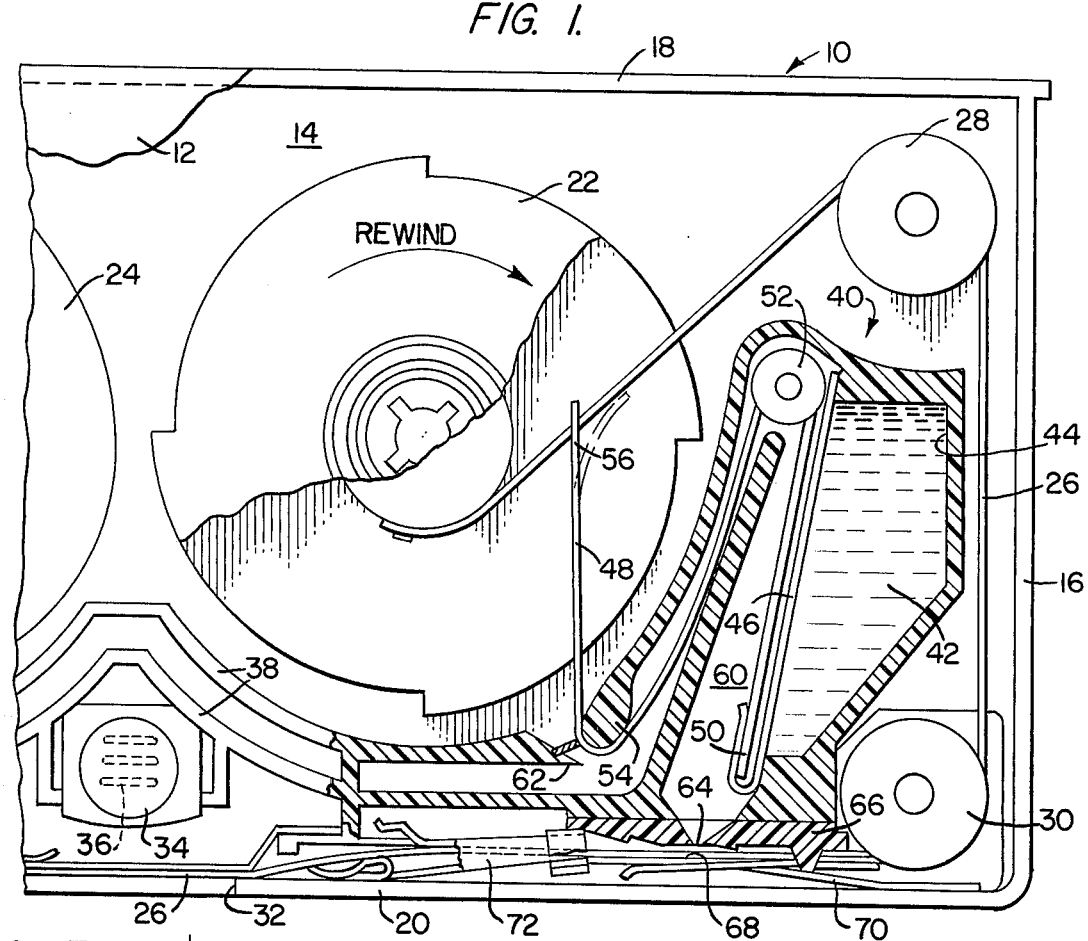
FIG. 1 is a fragmentary cross-section taken longitudinally through a multipurpose cassette with which the method and apparatus of the present invention is especially adapted for use.

The multipurpose film cassette with which the method and apparatus of the present invention is particularly adapted for use is illustrated in FIG. 1 to include an outer housing 10 in the shape of a rectangular parallelepiped having front and back walls 12 and 14 respectively, end walls 16, a top wall 18 and a bottom wall 20. Mounted for rotation between the front and back walls are supply and take-up spools 22 and 24 to which supply and take-up leader ends of a film strip 26 are affixed by appropriate means. In passing from the supply spool 22 to the take-up spool 24, the film strip 26 is trained through a series of generally straight runs defined in part by idler rolls 28 and 30. As shown, the film strip 26 is trained over an opening 32 in the bottom wall 20 both for exposure in an appropriate camera (not shown) and also for projection in a viewer or projector (also not shown) by illumination passed through a reflecting prism lens 34 mounted in the cassette behind the opening 26 and the film strip run passing thereover. Situated behind the prism 34 are air vent openings 36 in the rear walls 14 to enable the circulation of air over the prism 34 for cooling and also for drying after film strip processing in the manner to be described below. Both the air vents 36 and the prism 34 are isolated from the supply and take-up spools 22 and 24 by a labyrinth-type light seal formed in part by internal ribs 38.

Also contained in the cassette housing 10 is a processor generally designated by the reference numeral 40 and operative after exposure of the film strip 26 to deposit a layer of processing fluid 42 onto the emulsion side of the film strip and over the entire length thereof. The processor includes a reservoir 44 in which the processing fluid 42 is initially sealed by a tear tab closure 46 secured over a planar opening in the reservoir. Although the fluid chamber 44 is shown in FIG. 1 to be established by an integral processor construction, cassette manufacture in practice is facilitated by the use of a separate pod adapted to be received in the processor, the pod being loaded with the processing fluid 42 and having affixed thereto the tear tab closure 46.

To enable release of the initially sealed processing fluid 42 from the chamber 44 after exposure of the film strip 26, a pull strip 48 having one end 50 releaseably secured to the tear tab closure 46 is trained about a guide roller 52 and a radius wall portion 54 so that a free end 56 of the pull strip may be engaged by an aperture (not shown) in the supply spool end of the film strip 26 upon initial rewind movement thereof. The operation of the pull strip 48 is described fully in a copending application Ser. No. 428,377, filed Dec. 26, 1973, by Joseph A. Stella et al. and assigned to the assignee of the present invention. In essence, the free end portion 56 of the pull strip 48 will ride against the film strip 26 in the position illustrated in phantom lines in FIG. 1 as the film strip is payed from the supply spool 22 to the take-up spool 24 during exposure of the film strip. Reversal of the film strip during rewind, however, will effect an attachment of the pull strip to the supply end leader of the film strip so that the pull strip will be wound with the film on the supply spool. As a consequence, the tear tab closure 46 will be drawn away from the reservoir opening to release the processing fluid 42 to a second chamber 60 in the processor. A knife-like edge 62 adjacent the radius portion 54 will cause the tear tab 46 to release from the pull strip 48 so that the tear tab 46 will not be carried with the pull strip 48 within the convolutions of film wound on the supply spool 22.

The chamber 60 is located over an opening 64 in a processing fluid applicator nozzle 66 to be described in more detail below. Also, a pressure pad 68 supported by a leaf spring 70 retains the film strip in operative relation to the nozzle 66 during processing. A valve member 72 is adapted to be engaged by an appropriate surface discontinuity (not shown) in the take-up leader end of the film strip 26 so that it will be advanced from the position shown in FIG. 1 to a position closing the nozzle opening 64 upon completion of the processing operation.

It is to be noted that the multipurpose cassette and components thereof described in the preceding paragraphs represent a cassette structure which in itself is not novel with the present invention. It is important to a full understanding of the method and apparatus of the present invention, however, that the characteristics and operation of the cassette illustrated in FIG. 1 be understood. Specifically, after exposure of the film strip by incremental advance thereof past the opening 32 in a direction proceeding from the supply spool 22 to the take-up spool 24, a processing operation is initiated by driving the supply spool at constant angular velocity to rewind the film strip from the take-up spool 24 back onto the supply spool 22. This procedure is effected by removing the cassette from the camera in which it is exposed and placing it in a viewer device (not shown) equipped with appropriate means for driving the supply spool 22 to rewind the film strip 26 in the manner described. During such rewinding movement, the emulsion side of the film strip will be drawn past the nozzle opening 64 to receive a layer of processing fluid now released from the chamber 44 as a result of the closure 46 having been removed in the manner described above. Because the effective radius of pull by the supply spool will increase as convolutions of the film strip are wound on the supply spool, and because the supply spool is driven at constant angular velocity, the linear velocity of the film strip in the run passing the nozzle opening 64 will increase as the processing operation progresses along the length of the film strip. Subsequent to processing in this manner, the film strip is advanced incrementally, frame by frame, past the opening 32 and the prism lens 34 for projecting of successive image frames in a manner well-known in the motion picture art.

Figure 2:
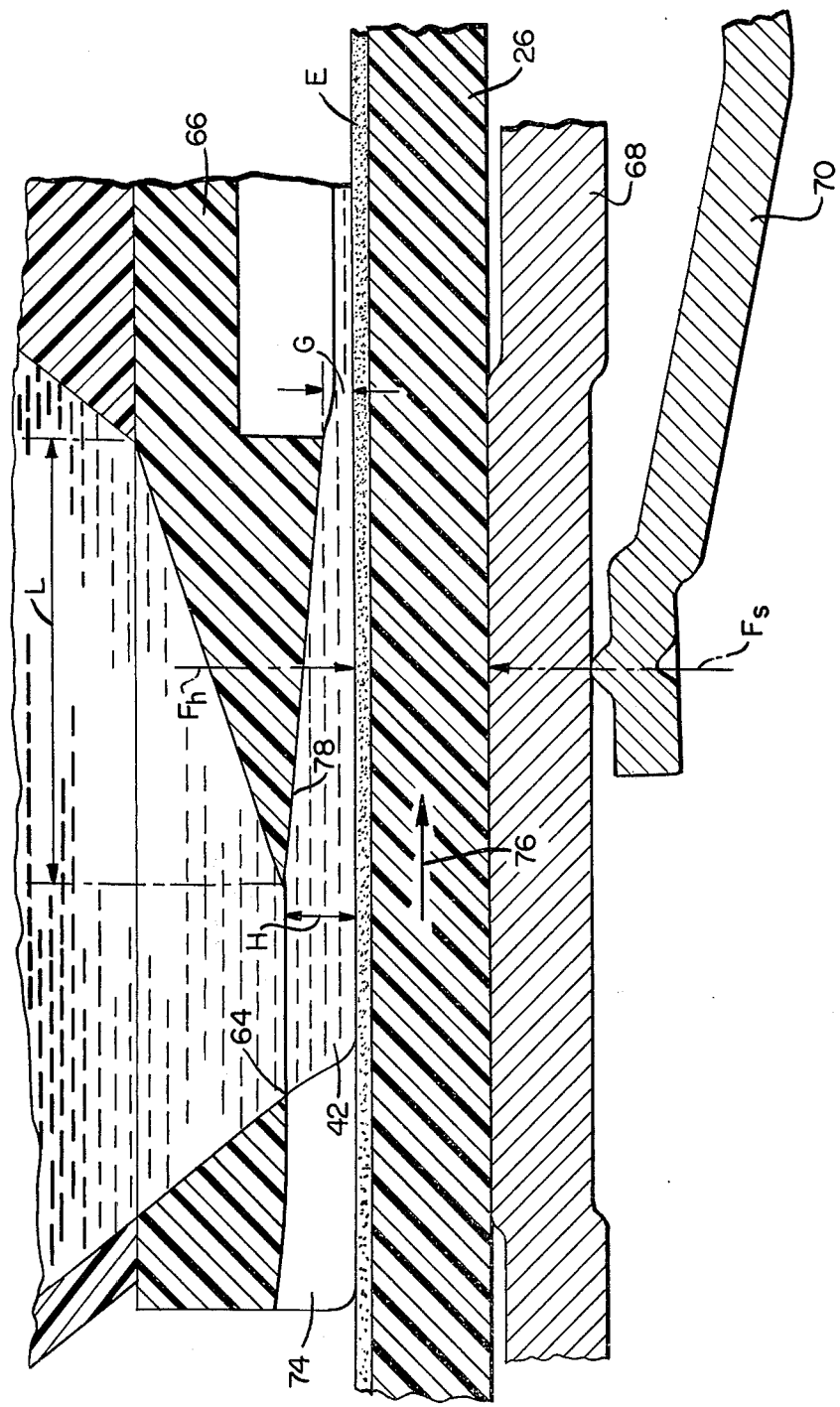
FIG. 2 is a greatly enlarged longitudinally cross-section illustrating the operative components by which a layer of processing fluid is deposited on a moving run of a photographic film strip.

The configuration of the nozzle 66 and the manner in which the processing fluid 42 is applied to the exposed emulsion side of the film strip 26 is illustrated at a greatly enlarged scale in FIG. 2 of the drawings. As disclosed in the above-mentioned copending application Ser. No. 360,678, the nozzle 66 makes sliding contact with the film strip on opposite sides of the emulsion E by way of a pair of runners 74 extending the length of the nozzle and positioned on opposite sides of the nozzle aperture 64. As a result, the plane of the nozzle opening 64 is retained elevated above the surface of the emulsion E by a distance H. Following the opening in relation to film strip travel during processing in the direction of the arrow 76 is an inclined doctoring surface 78 spanning the transverse distance between the runners 74 and of a length designated by the dimension L. As a result of the angle of inclination of the doctoring surface 78 and the length L thereof, the trailing edge is positioned above the emulsion E to establish a gap G, the height of which is less than the dimension H as shown.

In accordance with the method and apparatus of the present invention, the dimensions H, L, and G are selected not only to achieve a desired thickness of processing fluid coating on the emulsion layer E but also to develop a predetermined hydrodynamic force component $F_h$ tending to bias the film strip away from the nozzle 66. Also in accordance with the present invention, the biasing force of the spring 70 is selected so that the film strip 26 is engaged slideably on the side thereof opposite from the emulsion E and urged by a force $F_s$ which is essentially equal to and opposite the force $F_h$. As a result of the net balance of forces acting on the film strip 26, any foreign particles such as dust or the like on the surface of the emulsion E which may otherwise be trapped and accumulate at the trailing edge of the inclined doctoring surface 78, will effect a slight instantaneous increase in the gap G between the trailing edge of the doctoring surface and the emulsion sufficient to allow the foreign particle to pass with the coating of processing fluid 42 on the emulsion. The individual particles, in themselves, are of no consequence to either the processing of the exposed emulsion E or during projection of the images recorded in the processed emulsion for viewing purposes because of their minute size.

Figure 3:
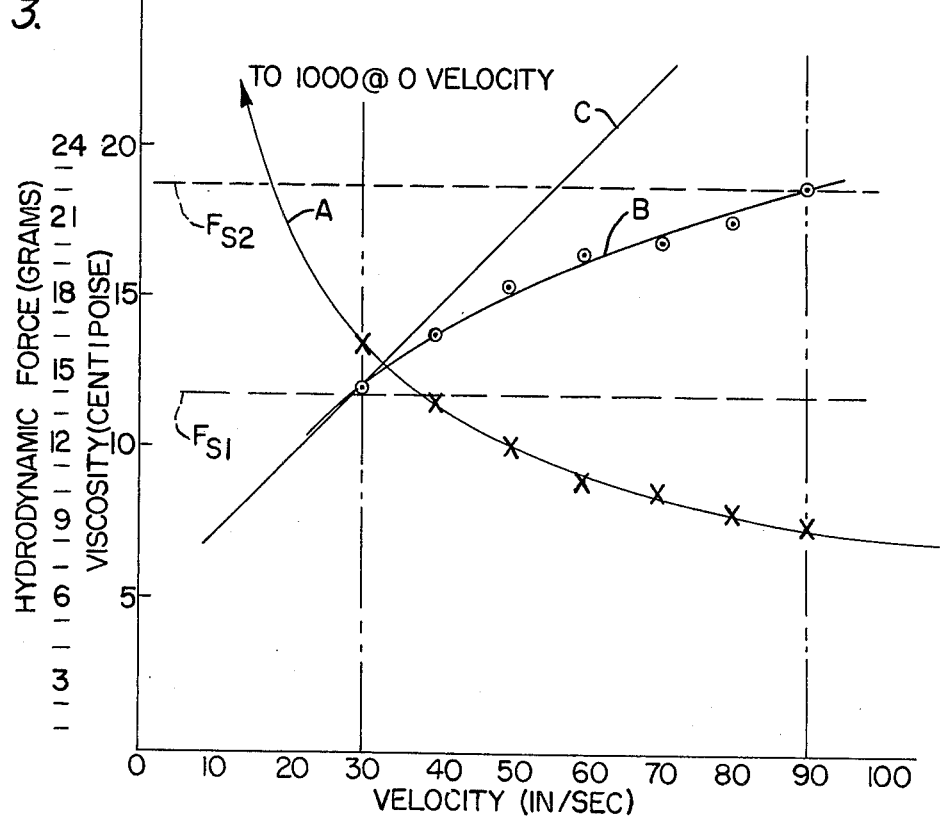
FIG. 3 is a graph including curves representing the variable parameters accounted for by the method and apparatus of the present invention.

The manner in which the magnitude of the force components $F_h$ and $F_s$ is determined may be understood by reference to FIG. 3 of the drawings. In FIG. 3, curve A depicts variation in processing fluid viscosity in centipoise units with variation in film strip velocity during processing in inches per second. In this respect, the processing fluid 42 is a non-newtonian fluid having an initial or static viscosity of approximately 1,000 centipoise. As a result of the shearing action imposed on the fluid between the doctoring surface 78 and the emulsion side of the film strip 26, however, the mean viscosity of the fluid will reduce to approximately 13.5 centipoise at linear film velocities approximating 30 inches per second and reduce further along the curve A to approximately 7.5 centipoise at film velocities of 90 inches per second. Also in this respect, it is noted that linear film velocity during rewind on the supply spool 22 in the cassette will range from approximately 30 inches per second at the initiation of the processing operation to 90 inches per second near the end of the processing operation. As mentioned above, the variation in linear film speed is as a result of the increasing torque or wrap radius due to build-up of film strip convolutions on the spool 22.

Curve B in FIG. 3 is a result of plotting hydrodynamic force in grams developed by the doctoring surface 78 and processing fluid where the gap G between the trailing edge of the doctoring surface 78 and the emulsion side of the film strip is fixed at a constant value. Because of the reduction in processing fluid viscosity with increasing film strip velocity as depicted in curve A, the increase in hydrodynamic force from approximately 14 grams at 30 inches per second to approximately 23 grams at 90 inches per second is reduced substantially by comparison to the increase which would be experienced if viscosity of the processing fluid remained constant, the difference being represented in FIG. 3 by a comparison of the ordinate values of the curve C and those of the curve B.

The hydrodynamic force $F_h$ also will be affected by variations in the height of the gap G at the trailing edge of the doctoring surface 78. Specifically, any increase in the gap G will decrease the value of the force $F_h$ for a given film strip velocity and vice versa. Because the minimum height of the gap G is established by the nozzle runners 74, a gap variation will occur only when the hydrodynamic force $F_h$ exceeds the spring force $F_s$ to increase the gap G. This situation will effect a balance of the forces $F_h$ and $F_s$ at a constant value. With reference again to FIG. 3, if the value of the spring force is selected to be the lowest value of the hydrodynamic force on curve B or the lowest value of the hydrodynamic force during processing and travel of film at its minimum velocity of 30 inches per second, thus to provide a spring force $F_{s1}$, the hydrodynamic force and the spring force will be in balance at a constant value ($F_{s1}$) throughout the processing operation with an attendant increase in the size of the gap G as a result of increases in film strip velocity.

If, on the other hand, the spring force $F_s$ is selected to be the maximum value of hydrodynamic force achieved during the processing operation or the value $F_{s2}$ in FIG. 3 equal to the hydrodynamic force developed at film speeds of 90 inches per second, the hydrodynamic force $F_h$ will be less than the spring force $F_{s2}$ during the portion of the film strip processing at which the strip is moving at velocities less than 90 inches per second. Because the presence of a dust particle or the like on the film strip will have the effect of an instantaneous rise in the force $F_h$ over and above the ordinate values on the curve B in FIG. 3, the spring 70 will yield sufficiently for the gap G to open and allow such a particle to pass. It is contemplated, therefore, that the supporting spring force $F_s$ may range between minimum and maximum values of the hydrodynamic force $F_h$ developed as a result of variation in film run travel velocities during the processing cycle, assuming a constant gap G.

It is to be noted that the minimum value of the spring foce, $F_{s1}$ in FIG. 3, is a relatively fixed limit on the range of spring forces which might be used in the operation of the multipurpose film cassette illustrated and described herein. Spring force values lower than $F_{s1}$ could result in such problems as increasing the thickness of the processing fluid coating on the film strip or cause leakage of the fluid around the film strip to a point where the supply of processing fluid in the reservoir 44 might be inadequate to cover the entire length of the film strip 26. On the other hand, the maximum value of the spring force or $F_{s2}$ in FIG. 3 might be increased without critical deleterious effects other than those which have resulted in the past from the accumulation of dust or other particles at the trailing edge of the doctoring surface 78. Hence the definition of the upper limit of the spring force magnitude is less precise than that of the minimum spring force magnitude in the practice of the present invention.

It will be appreciated also that the hydrodynamic force developed by the doctoring surface 78 will be effected by the length and inclination thereof. Exemplary dimensions which have been found satisfactory in practice with film speed velocities varying from 30 to 90 inches per second and where the processing fluid 42 exhibits the non-newtonian fluid viscosity characteristics described above, include a length of doctoring surface or a length of doctoring surface represented by the dimension L in FIG. 2 of approximately 0.150 inches; a doctoring surface leading edge height (the dimension H) of approximately 0.0021 inches and a height in the gap G in the range of 0.0006 to 0.0009 inches. These dimensions provide a processing fluid coating on the emulsion E approximately 0.0005 inches in thickness. The transverse width of the emulsion E, the opening 64 and of the doctoring surface 78 are approximately 0.225 inches for the film strip used.

Thus it will be seen that as a result of the present invention an improved method and apparatus is provided for the application of a processing fluid to an exposed film strip in a multipurpose cassette and by which the above-mentioned objectives are fulfilled. Also it is to be noted that variations in the method and apparatus described herein will be apparent to those skilled in the art that various modifications and/or changes in the embodiments disclosed herein can be made without departure from the invention. It is expressly intended therefore that the foregoing is illustrative of preferred embodiments only, not limiting, and that the true spirit and scope of the present invention be determined by reference to the appended claims.

What is claimed is:

1. In a cassette configured for retaining a photographic film strip having a light sensitive emulsion on one surface thereof, said cassette containing a processor operative to deposit processing fluid on a moving run of the film strip after exposure of the film emulsion; said processor having a nozzle opening through which the processing fluid is passed into contact with the film emulsion, a doctoring surface following said nozzle opening in the direction of moving run travel, said doctoring surface being configured during moving run travel to produce a hydrodynamic force component of predetermined minimum and maximum magnitude within the processing fluid and directed toward the film strip when the emulsion surface is spaced a given minimum distance from said doctoring surface, and a pressure pad configured for engaging the other side of the film strip opposite said doctoring surface, the improvement comprising:

means for biasing said pressure pad against the film strip to urge the film strip toward said doctoring surface with a force at least substantially equal to said predetermined minimum magnitude and equal to or less than said predetermined maximum magnitude and opposite to said hydrodynamic force component such that said biasing means in cooperation with said pressure pad urges the film strip toward said doctoring surface with a force generally balancing the hydrodynamic force thereby providing deflection of said pressure pad and the film strip away from said doctoring surface responsive to fluid or film strip carried particles engaging said doctoring surface in a manner tending to provide increased force between said doctoring surface and the film strip so as to permit such particles to pass by said doctoring surface.

2. The apparatus of claim 1 wherein said doctoring surface is a surface inclined to the film strip.

3. The apparatus recited in claim 1 wherein the moving run of film is drawn by a spool rotated at substantially constant angular velocity thereby to increase the linear velocity of the moving run as the film strip is wound on the spool, such increase in linear velocity tending to cause an increase in said hydrodynamic force initially from said predetermined minimum magnitude to finally said predetermined maximum magnitude if the spacing between the film and the doctor blade were maintained constant, and wherein the force exerted by said biasing means substantially falls within the range of said predetermined minimum and maximum hydrodynamic force magnitude.

4. The apparatus of claim 1 wherein said cassette is configured for operation varying the linear velocity of the moving run of film between minimum and maximum values tending to cause an increase in said hydrodynamic force between said predetermined minimum and maximum magnitudes if the spacing between the film strip and said doctoring surface were maintained constant, and said biasing means supports the film strip with a force within the range of said predetermined minimum and maximum magnitudes.

5. The apparatus of claim 1 wherein said force of said biasing means is approximately equal to said minimum magnitude.

6. The apparatus recited in claim 5 in which said means for biasing said pressure pad is a spring stressed to exert a force in the range of 14 to 23 grams.

7. The method of depositing a coating of processing fluid on the emulsion side of a photographic film strip in a cassette following exposure of the film strip, comprising the steps of:

trailing a run of said film strip across an opening through which a layer of said processing fluid is deposited onto the emulsion side of said film strip;

moving said film strip run longitudinally across said opening;

spacing a doctoring member from said emulsion side of said film strip and doctoring said layer of processing fluid against the emulsion side of said film strip to develop in said layer of processing fluid a hydrodynamic force component of predetermined minimum and maximum magnitude in a direction tending to displace said film strip away from said doctoring member; and supporting the other side of said film strip opposite said doctoring member with a force opposite to and at least substantially equal to said predetermined minimum and substantially equal to or less than said predetermined maximum magnitude of said hydrodynamic force component to approximately balance said hydrodynamic force and thereby permit deflection of said film strip away from said doctoring member responsive to particles carried by the film strip or the fluid engaging said doctoring member in a manner tending to provide increased force between said doctoring member and said emulsion surface so as to thereby permit such particles to pass said doctoring member.

8. The method recited in claim 7 wherein said processing fluid is a non-newtonian fluid having a viscosity which varies inversely as the velocity of said film strip run, the velocity of said film strip run being developed by rotation of a film spool at a substantially constant angular velocity causing a substantially constantly increasing velocity of the film strip run and thereby causing an increase in said hydrodynamic force component with increase in film run velocity if said spacing of said doctor member to said film strip were maintained constant, the velocity of said film strip responsive to rotation of said film spool varying initially from a predetermined minimum value to a predetermined maximum value during said film strip run thereby causing said hydrodynamic force component to vary initially from said predetermined minimum value to said predetermined maximum value when said spacing of said doctoring member is maintained constant, and said supporting force is in the range between substantially said predetermined minimum magnitude of said hydrodynamic force component and substantially said predetermined maximum magnitude thereof.

9. The method recited in claim 7 wherein said doctoring step is effected by an inclined doctoring surface having a trailing edge defining a doctoring gap with the emulsion side of the film strip and wherein said gap increases during movement of said film strip run in relation to said opening thereby to maintain said hydrodynamic force equal to said supporting force.

10. The method recited in claim 7 wherein said moving step includes moving said film strip across said opening at a linear velocity ranging from a minimum to a maximum value thereby causing an increase in said hydrodynamic force component with increase in film run velocity from said predetermined minimum to said predetermined maximum magnitude if said spacing of said doctoring member to said film strip were maintained constant, and said supporting force is substantially within the range between the minimum and maximum magnitude of said hydrodynamic force component during movement of said film strip run in relation to said doctoring member.

11. In a cassette configured for retaining a photographic film strip having a light-sensitive emulsion on one surface thereof, said cassette containing a processor operative to deposit processing fluid on a moving run of the film strip after exposure of the film emulsion; said processor having a nozzle opening through which the processing fluid is passed into contact with the film emulsion, a doctoring surface following said nozzle opening in the direction of moving run travel, said doctoring surface being spaced from the film emulsion and configured during moving run travel to produce a hydrodynamic force component within the processing fluid and directed toward the film strip, the trailing edge of said doctoring surface defining a gap with the emulsion surface of the film strip, said gap ranging between 0.0006 to 0.0009 inches, and a pressure pad for engaging the other side of the film strip opposite from the emulsion and said doctoring surface, the improvement comprising:

means for biasing said pressure pad and thus the film strip toward said doctoring surface with a force of approximately the same magnitude as and opposite to said hydrodynamic force component developed within the processing fluid between said doctoring surface and the moving run of the film strip during processing, said means for biasing said pressure pad and film strip comprising a spring stressed to exert a force on said pressure pad in the range of approximately 14 to 23 grams.

12. The method of depositing a processing fluid on the emulsion side of a photographic film strip in a cassette following exposure of said film strip, said method comprising the steps of:

trailing a run of said film strip across an opening through which processing fluid is passed onto the emulsion side of said film strip;

moving said film strip run longitudinally across said opening at a speed varying between 30 and 90 inches per second;

spacing a doctoring member from said emulsion side of said film strip to provide a gap therewith in the range of 0.0006 to 0.0009 inches and doctoring said processing fluid against the emulsion side of said film strip to develop a hydrodynamic force component in a direction tending to displace said film strip away from said doctoring member; and supporting said film strip with a force opposite to and of approximately the same magnitude as said hydrodynamic force component and in the range of from 14 grams to approximately 23 grams so as to approximately balance said hydrodynamic force and thereby permit deflection of said film strip away from said doctoring member responsive to irregularities carried by the film strip or the fluid engaging said doctoring member.

* * * * *